No. 769,618. PATENTED SEPT. 6, 1904.
A. LOTZ.
MEANS FOR OBSERVING DUST LADEN AIR CURRENTS.
APPLICATION FILED JUNE 3, 1904.
NO MODEL.
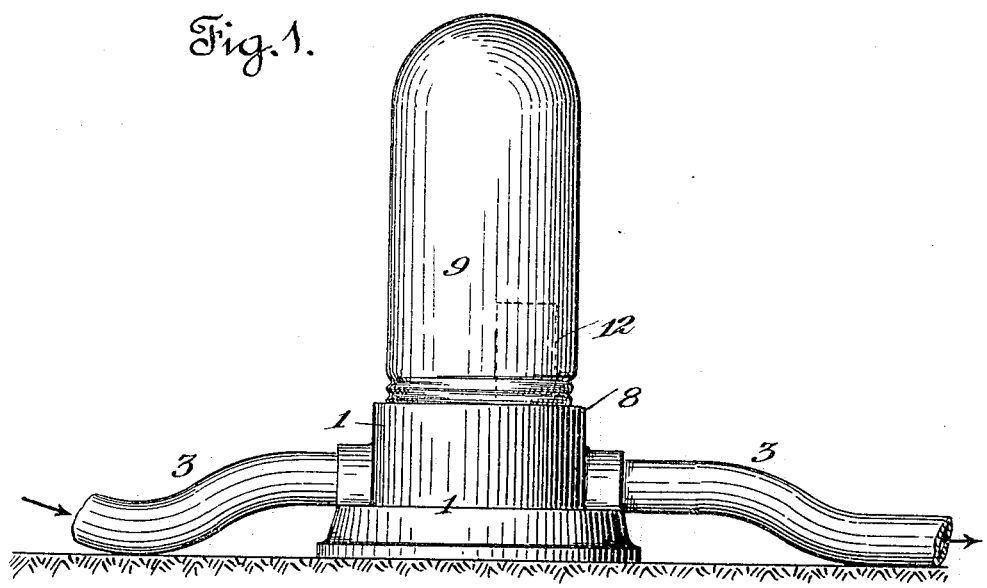
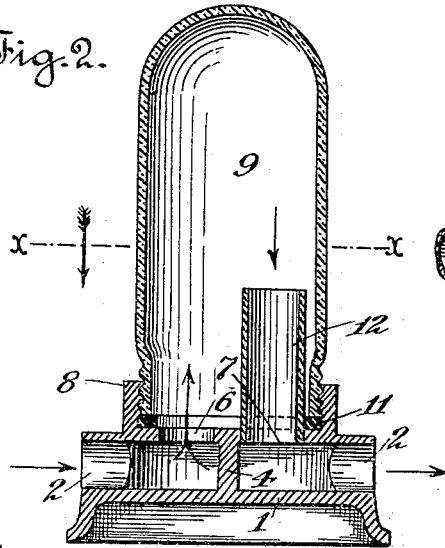
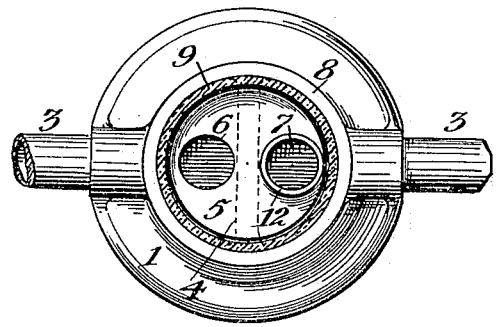
Witnesses,
M. R. Seely
George Martyn
Inventor,
Augustus Lotz
by Spear & Seely
Attorneys.

No. 769,618. Patented September 6, 1904.

UNITED STATES PATENT OFFICE.

AUGUSTUS LOTZ, OF SAN FRANCISCO, CALIFORNIA.

MEANS FOR OBSERVING DUST-LADEN AIR-CURRENTS.

SPECIFICATION forming part of Letters Patent No. 769,618, dated September 6, 1904.

Application filed June 3, 1904. Serial No. 211,040. (No model.)

*To all whom it may concern:*

Be it known that I, AUGUSTUS LOTZ, a citizen of the United States, residing at San Francisco, in the county of San Francisco and State of California, have invented certain new and useful Improvements in Means for Observing Dust-Laden Air-Currents, of which the following is a specification.

In using modern methods of removing dust, dirt, and foreign matter generally from carpets, upholstery, fabrics, &c., by currents of air it is desirable to inspect the progress of the work while the process is in operation and without stopping the apparatus. The dust-laden air passes through a tube, pipe, or hose to some destination, and the first attempt at visual inspection consisted in using a section of glass tubing in the air-passage. It was thought that the passage of the dust through such glass section could be perceived; but it was found in practice that the velocity of a dust-laden current passing at its normal rate of speed through the glass section rendered the dust invisible and showed nothing to the eye but a general cloudy effect. I discovered that if means be employed in the tube, pipe, or hose for temporarily diverting the air-current the dust in the air will become visible through a suitable glass and this without in any way affecting the main operation.

A practical embodiment of my invention is shown in the accompanying drawings.

Figure 1 is an elevation. Fig. 2 is a vertical section. Fig. 3 is a cross-section on line *x x* of Fig. 2.

In the form shown, 1 is a hollow metal structure having openings 2 2 to receive the air-pipe 3 3, preferably by slip-joint connection. This hollow structure is divided by a partition 4. In the top plate 5 of the divided chamber thus formed are openings 6 and 7, located on opposite sides of the partition. Above the top plate rises a rim or flange 8, which is shown as internally screw-threaded, and to this rim is connected the threaded glass chamber 9, a suitable packing-gasket 11 being interposed between the said chamber and the top plate 5 to make an air-tight joint. In one of the openings, preferably the outlet 7, is fitted a tube 12, which extends into the glass chamber.

I have shown the structure in a vertical position resting upon its base, and such will be its natural or ordinary position in use; but it can lie on its side or lean at any angle, since its visual efficiency does not depend in any way upon the position in which it is placed.

In describing the operation of the device it must be assumed that a dust-laden current of air is passing through the hose, tube, or pipe 3 3, in which my device is interposed, as indicated by arrows in Figs. 1 and 2. The current entering the hollow structure 1 strikes the partition 4 and is diverted and compelled to take the only possible course through the opening 6 and into the glass chamber, the cross-sectional area of which is large relatively to that of the passage 3. The diverted current expands into the glass chamber in a condition of disturbance, the effect of which is clearly visible in the eddying and whirling of dust, tending to precipitate, but unable to do so on account of the air-pressure from behind and the air-suction from ahead. I use the terms "pressure" and "suction" in this connection only in relation to the action at this point, because the actual current of air can be produced by pressure or by suction, or by both.

The tube 12, rising above the opening to which it is connected, prevents the current from finding a short passage out of the glass chamber and compels it to create a disturbance throughout the said chamber. Since, however, said tube 12 is the only exit, the dust-laden current is compelled to enter said tube and then to escape through the hollow base on the other side of the partition 4 from which it entered. Thence it continues through the main pipe or hose to its destination. There is no precipitation, deposit, or accumulation of dust whatever in the chamber 9, because of the strong air-current which reaches every part of said chamber.

By my invention the operation of the cleaning system can be observed at any time while the work is actually in progress, and this is an important advantage from two points of view. First, it enables the operator in charge to know without stopping the operation whether the removal of the dust is progressing satisfactorily. Further, it is a matter of satisfaction to the party whose carpets or furniture or fabrics of any kind are being cleaned to observe the actual progress of the work and see the dust in process of removal.

The embodiment of my invention shown in the drawings and herein described is not the only embodiment of which it is capable, and I therefore do not limit myself to the particular construction thus shown and described, as I desire to avail myself of such modifications and equivalents as fall properly within the spirit of my invention.

Having thus described my invention, what I claim as new, and desire to secure by Letters Patent, is—

1. In combination with a passage for a current of dust-laden air means in said passage for intercepting the current, such means including a transparent chamber, in which the action of the intercepted current can be observed.

2. In combination with a passage for a current of dust-laden air, means connected in said passage for changing the direction of the current, such means including a transparent receptacle, in which the action of the current in its changed direction can be observed.

3. In combination with a passage for a current of dust-laden air, means in said passage for intercepting the current and compelling it to change its direction, and a transparent chamber into which the intercepted current is admitted and from which it is discharged.

4. In combination with a passage for a current of dust-laden air, a transparent chamber projecting at an angle to the general direction of said passage, and means for compelling the current to enter said chamber and to leave said chamber and return to said passage.

5. In combination with a passage for a current of dust-laden air, a hollow structure, interposed and connected in said passage, a partition in said structure, a transparent chamber connected to said structure, and an opening between said structure and said chamber on each side of said partition.

6. A device for the described purpose comprising a hollow structure having an interior partition, openings in said structure for communicating with inlet and outlet air-pipes, and a transparent chamber connected to said structure and communicating with the same on both sides of said partition.

7. Means for visually observing the passage of a current of dust-laden air through a pipe, tube or hose, comprising a transparent chamber connected in said pipe, tube or hose, and of larger cross-sectional area than said pipe, tube or hose.

8. A device for rendering dust-laden air-currents visible, comprising a hollow structure, a transparent chamber connected thereto, means for connecting an air-pipe thereto, a partition in said hollow structure, an opening in said structure communicating with said chamber on each side of said partition, and a tube extending from one of said openings into the said chamber.

9. A device for the described purpose, comprising a hollow base, a partition dividing the same into two parts, means for connecting an air-pipe to said structure on both sides of said partition, an opening in the top plate of said hollow base on each side of said partition, a threaded rim extending above said top plate and a transparent chamber having an engaging thread.

10. A device for the visual observation of dust-laden currents of air, comprising a hollow base 1, having openings for connecting an air-pipe, hose or tube, an interior partition 4 in said base, a top plate 5 having openings 6 and 7 located at opposite sides of said partition, a transparent chamber 9, connected to said base and in communication with said openings, and a tube 12 connected with one of said openings and extending into said transparent chamber.

In testimony whereof I have affixed my signature, in presence of two witnesses, this 18th day of May, 1904.

AUGUSTUS LOTZ.

Witnesses:
J. H. MILLER,
S. W. SEELY.